March 13, 1962 R. N. BULAND ETAL 3,024,994
CROSSCORRELATION APPARATUS
Filed June 6, 1960 2 Sheets-Sheet 1

INVENTORS.
ROBERT N. BULAND
GEORGE R. COOPER
JACK MARGOLIS
BY THEIR ATTORNEYS
HARRIS, KIECH, RUSSELL & KERN

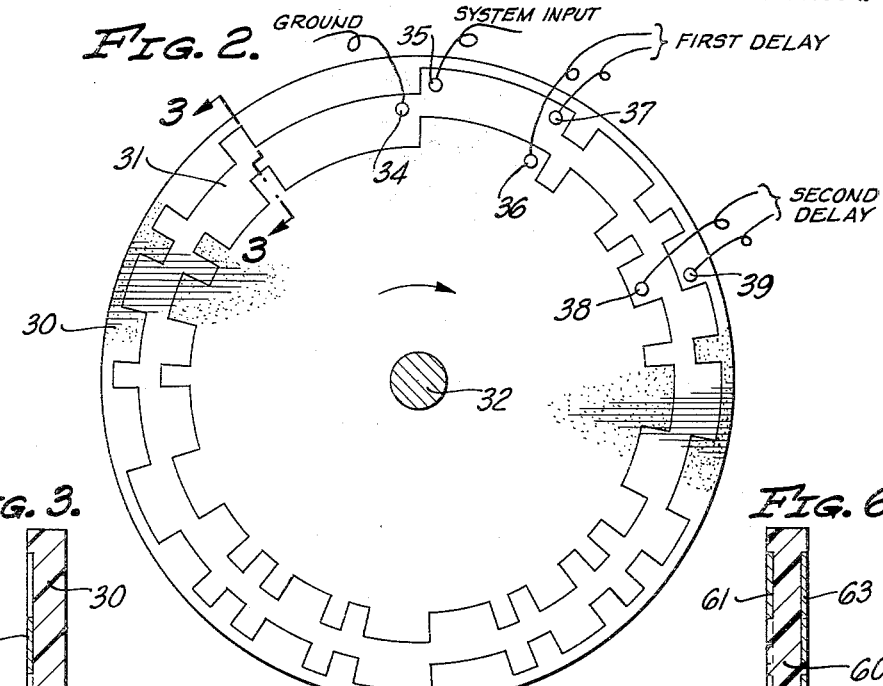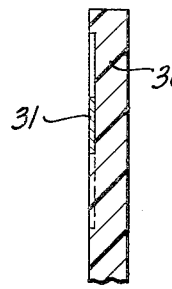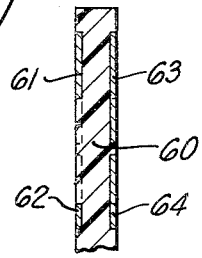

United States Patent Office 3,024,994
Patented Mar. 13, 1962

3,024,994
CROSSCORRELATION APPARATUS
Robert N. Buland, Tustin, Calif., George R. Cooper, West Lafayette, Ind., and Jack Margolis, Los Angeles, Calif., assignors to Ford Motor Company, Dearborn, Mich., a corporation of Delaware
Filed June 6, 1960, Ser. No. 34,090
6 Claims. (Cl. 235—181)

This invention relates to the measurement of dynamic characteristics of systems and, in particular, to new and improved apparatus for use in crosscorrelators.

The structure, operation and use of crosscorrelators for the measurement of the impulse response of a system are described in the copending application of George W. Anderson et al. entitled, Crosscorrelator, Serial No. 1935, filed January 12, 1960 and assigned to the same assignee as the present application. It is an object of the present invention to provide a new and improved apparatus for use in crosscorrelators such as those shown in the aforesaid copending application. A particular object of the invention is to provide a crosscorrelation apparatus in which the generation of the binary and periodic test signal for the system input, the generation of the plurality of delay signals, and the multiplication of the system output and delay signals are accomplished with a single device. A further object is to provide such apparatus including a rotating member which provides a plurality of switching operations in a specific sequence to produce the input signal to the system and the multiplication of the system output by a plurality of signals with various delays to provide the plurality of product signals for averaging and display. Another object is to provide such an apparatus wherein the amount of delay for each delay signal can be adjusted at will.

It is an object of the invention to provide a crosscorrelation apparatus for generating a binary and periodic test signal for a system input and a plurality of product signals equivalent to the output of the system multiplied by delay signals which correspond to the test signal but are delayed in time, which apparatus includes two input signal sources, switching means for coupling one or the other of the input signals to the system input to provide the desired binary test signal, a plurality of pairs of output lines, with one line of each pair connected to the system output and the other line of each pair connected to the complement of the system output, a plurality of switching means for coupling a line of each pair to an averaging filter input, with the switching means including a rotating member having at least two commutator tracks, with one track corresponding to the binary test signal and the other track being the complement of the one track, and means for rotating the member to provide the periodic test signal.

It is a further object of the invention to provide such an apparatus wherein one of the tracks has alternating conducting and nonconducting segments corresponding to the binary test signal and the other track has a complementary arrangement of conducting and nonconducting segments, and which includes means for connecting the conducting segments to a reference point, two potential sources connected to a junction point for connection to the system input, an input signal contact riding on the one track and connected to one of the potential sources, a plurality of pairs of delay signal contacts positioned for riding on the tracks, with each pair in radial alignment on the respective tracks, means for connecting the system output to each delay contact riding on one track and the complement of the system output to each delay contact riding on the other track, and means for interconnecting each pair of delay contacts to provide a product signal at each interconnection for coupling to the following averaging filter. A specific object is to provide such an apparatus wherein the two tracks comprise a single conducting band having a central continuous portion providing the reference point and two irregular edge portions providing the two segmented tracks.

It is another object of the invention to provide a crosscorrelation apparatus wherein the rotating member includes two pairs of annular tracks, with one pair of tracks having complementary conducting and nonconducting segments to provide the binary test signal and the other pairs of tracks having corresponding conducting and nonconducting segments to provide the multiplication of the system output by the delay signals.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 2 is a side view of a rotating member embodying the invention;

FIG. 3 is an enlarged partial sectional view taken along the line 3—3 of FIG. 2;

FIG. 5 is a fragmentary view of an alternative form of rotating member;

FIG. 6 is a partial sectional view taken along the line 6—6 of FIG. 5; and

FIG. 7 is a diagram illustrating the operation of the embodiment of FIG. 5.

Figure 1:
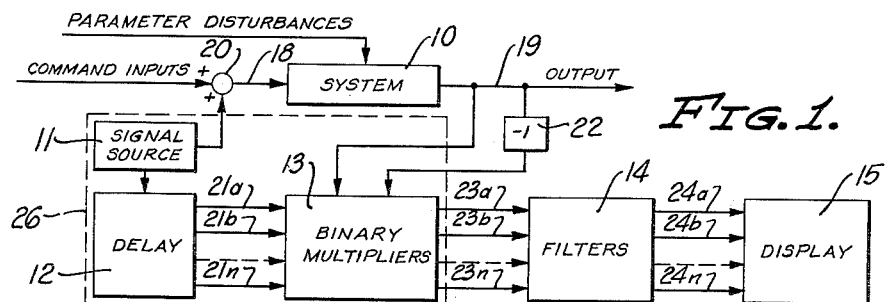
FIG. 1 is a block diagram of a crosscorrelator.

FIG. 1 shows a crosscorrelator of the type disclosed in the aforesaid copending application which is suitable for use in measuring the dynamic characteristics of a system 10 while the system is in operation. The crosscorrelator includes a signal source 11, a delay unit 12, a multiplier unit 13, a filter unit 14, and an output device such as a recorder or a display unit 15. Typically, the system 10 may be an automatic machine tool having one or more internal feedback loops and having an input 18 and output 19. Of course, the crosscorrelator is suitable for use with any system, including chemical processes and the like. Command signals are coupled to the input 18 and the system may also be subject to parameter disturbances including noise, power source variations, changes in environmental conditions, and the like.

The signal source 11 generates a binary and periodic test signal that is coupled to the system input 18 through a summing point 20. The test signal is also coupled to the delay unit 12. The delay unit generates a plurality of delay signals on lines $21a$, $21b$, $21n$, with each delay signal corresponding to the test signal but delayed a predetermined period of time. Each delay signal produces a point on the impulse response curve of the system being tested and the total number of delay signals and the time lag for each are selected to provide a suitable number of appropriately spaced points for the particular system under test. The multiplier unit 13 comprises a plurality of individual multipliers each of which has a delay signal, the system output, and the complement of the system output produced in an inverter 22, as inputs to produce a corresponding plurality of product signals on lines $23a$, $23b$, $23n$. The filter unit 14 comprises a low pass filter for each input line 23 to produce a corresponding plurality of averaged product signals on lines $24a$, $24b$, $24n$. The display unit 15 may be any of various conventional display or recording devices or combinations thereof. The unit may include an $n$ channel pen recorder which produces continuous charts of each input, may be an oscilloscope with a suitable time base for displaying all of the points on the response curve, may be a digital storage device which stores the outputs for further computation and control, or the like.

The operation of this crosscorrelator is described in detail in the aforesaid copending application and will not be repeated herein. The present invention relates to an apparatus for performing the functions of the signal source, the delay unit and the binary multipliers, the apparatus of the invention being directly substitutable for the components of FIG. 1 enclosed in the dashed line 26.

Figure 4:
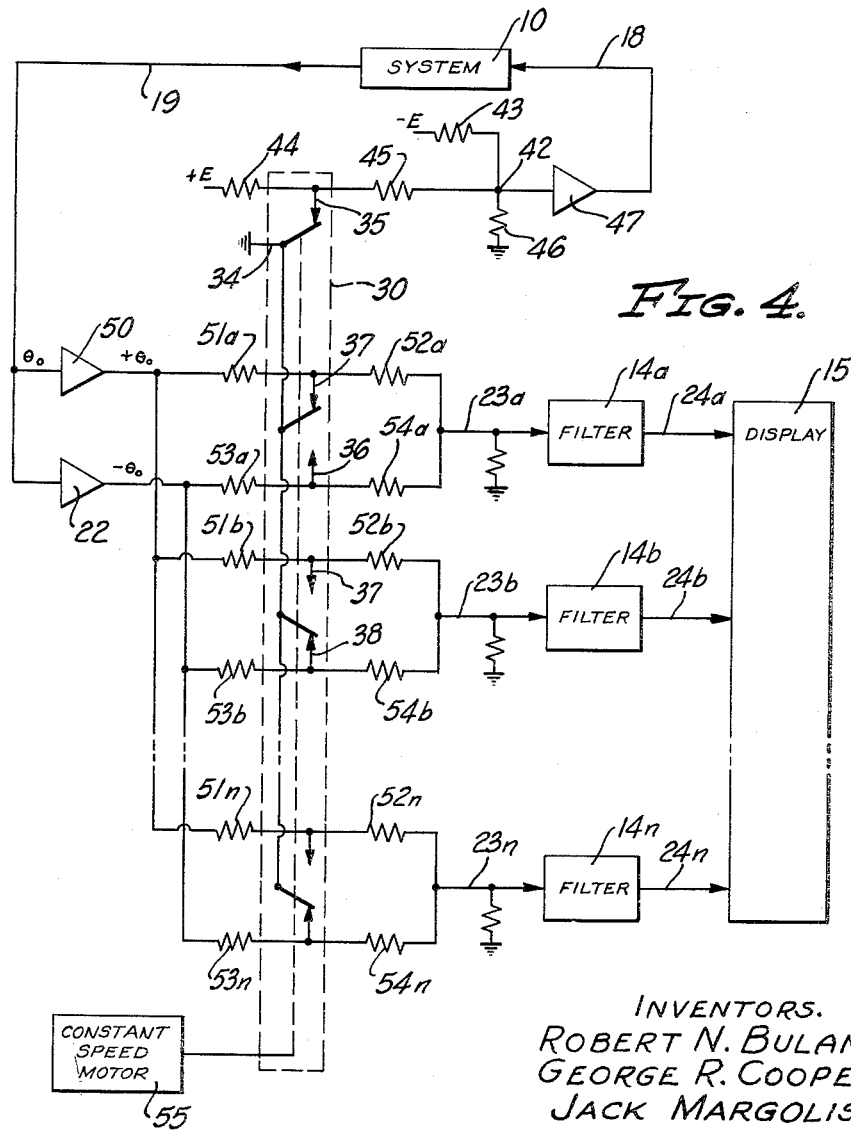
FIG. 4 is a schematic diagram illustrating the operation of the embodiment of FIG. 2.

A preferred embodiment of the invention is shown in FIGS. 2, 3 and 4 and includes a rotating member such as a disc 30 of insulating material having a band 31 of conducting material thereon. Of course, other physical shapes such as cylinders and cones could be used if desired. The conducting band 31 is made flush with the surface of the disc 30 and has inner and outer irregular edges which form inner and outer annular tracks of alternating conducting and nonconducting segments, the portions of the conducting band serving as the conducting segments. The central zone of the band is continuous and provides a common connection between the conducting segments of the two tracks. One of the tracks, the outer track in FIG. 2, corresponds to the desired binary test signal with the conducting segments being the +1 bits and the nonconducting segments being the −1 bits. The other track is made the complement of the first track so that for any given angular position on the disc, one track will have a conducting segment and the other a nonconducting segment. The disc is mounted on a shaft 32 for rotation by a motor or other suitable drive means to continuously rotate the disc.

A sliding brush or contact 34 is positioned for riding on the continuous zone of the conducting band. Another contact 35 is positioned for riding on one of the tracks, the outer track in FIG. 2. A pair of contacts 36, 37 is positioned in radial alignment for riding on the inner and outer tracks, respectively. Another pair of contacts 38, 39 is similarly positioned for riding on the inner and outer tracks, respectively. Each of these pairs of contacts provides a delay signal. Therefore, the number of pairs of such contacts utilized in a particular apparatus will depend upon the number of delay signals desired. The location of the pairs of delay contacts can be made adjustable so that the angular position between the contact 35 and a pair of delay contacts can be changed to vary the magnitude of delay obtained. The contacts of a pair have been illustrated and described herein as being in radial alignment. This is necessary because the complementary segments of the two tracks are in radial alignment. Of course, one track could be shifted angularly relative to the other, which would require a corresponding change in the angular position of the two contacts forming each pair.

FIG. 4 illustrates how the disc of FIG. 2 is utilized in a crosscorrelator, the disc being indicated by the dashed line 30. A potential source −E is connected to a junction point 42 through a resistor 43 and another potential source +E is connected to the junction point 42 through resistors 44, 45. The test signal for the system 10 is developed at the point 42 across resistor 46 and is coupled to the system through an amplifier 47. The junction between the resistors 44, 45 is connected to the system input contact 35. The contact 34, which rides on the continuous zone of the band, is connected to a reference point, here shown as the circuit ground.

The system output 19 is connected to a buffer amplifier 50 having a gain of +1 and to the inverter amplifier 22 having a gain of −1. The output of the amplifier 50 is connected to the filter input line 23a through resistors 51a, 52a, and to the remaining filter input lines through similar pairs of resistors. Similarly, the output of the inverter amplifier 22 is connected to the filter input line 23a through resistors 53a, 54a. The output of the amplifier 22 is connected to the other filter input lines in similar manner. The junction point of the resistors 51a, 52a is connected to the contact 37 of the first pair of contacts and the junction point of the resistors 53a, 54a is connected to the other contact 36 of the pair. Similarly, the junction point of the resistors 51b, 52b is connected to the contact 39 and the junction of the resistors 53b, 54b is connected to the contact 38.

The disc 30 is driven by motor 55 which preferably operates at a constant speede to provide the periodic test signal and the plurality of delay signals. As the disc rotates, the system input contact 35 is alternately grounded and open-circuited. When grounded, the +E voltage is grounded through the resistor 44 and the input signal to the system is a function of the −E voltage and the resistors 43, 46. When the contact is open-circuited, the input voltage to the system is also a function of the +E voltage and the resistors 44, 45. The magnitudes of the two voltage sources and the four resistors are selected to provide the desired binary input signals corresponding to the +1 and −1 bits.

As the disc rotates, the pair of contacts 36, 37 is alternately connected to circuit ground so that the outputs of the amplifiers 50, 22 are alternately connected to the filter input line 23a, i.e., one amplifier output is grounded so that only the other amplifier output provides a signal to the filter. The resistors 51a, 53a provide loads on the respective amplifiers when connected to circuit ground and the resistors 52a, 54a provide isolation for the filter input from the grounded contact. The other pairs of delay contacts operate in the same manner.

The rotation of the disc 30 periodically generates the desired binary test signal for coupling to the system input and simultaneously carries out the binary multiplication of the system output for any desired number and magnitude of delays to generate the product signals for subsequent filtering and display. This crosscorrelation apparatus provides a very small, compact and inexpensive mechanism which is easy to fabricate and assemble and which is extremely reliable and trouble free. The apparatus is also quite flexible, providing for variation in the number of delay signals and variation in the magnitude of delay for each signal and also providing for a change in the length of the period by changing the rotation speed of the disc.

An alternative form of the invention utilizing separate tracks for the test signal and binary multiplication is shown in FIGS. 5, 6 and 7. A disc 60 of insulating material has conducting bands 61, 62 on one side and conducting bands 63, 64 on the reverse side, with all of the bands being flush with the disc. Each of the bands includes a continuous zone and a track formed of alternating conducting and nonconducting segments, with the conducting segments connected to the continuous zone to form the band. The track of the band 61 is complementary to the track of the band 63, similar to the two tracks of the band 31 of the disc 30 of FIG. 2. Also, the track of the band 62 is complementary to the track of the band 64. The tracks of the bands 61 and 62 are identical and correspond to the desired binary test signal. The two tracks are ordinarily angularly aligned as shown in FIG. 5, but, of course, could be shifted if desired. A contact 65 is positioned for riding on the continuous zone of the band 62 and a contact 66 is similarly positioned for riding on the continuous zone of the band 64. A pair of contacts 67, 68 is positioned for riding on the tracks of the bands 62, 64, respectively, with the contacts being in radial alignment. The contacts 65, 66 are connected to potential sources +E, −E, respectively, as shown in FIG. 7. The contacts 67, 68 are interconnected to provide the test signal to the input of the system 10 through the amplifier 47.

A contact 69 is positioned for riding on the continuous zone of the band 61 and another contact 70 is positioned for riding on the continuous zone of the band 63. A pair of contacts 73, 74 is positioned for riding on the tracks of the bands 61, 62, with the contacts in radial alignment. Additional pairs of contacts, such as 75, 76, are similarly positioned for riding on the tracks of the bands 61, 63. Any number of pairs may be used to provide the desired number of delay signals.

The contact 69 is connected to the output of the inverter amplifier 22 and the contact 70 is connected to the output of the amplifier 50. The pair of contacts 73, 74 is interconnected to provide the input to the filter 14a. Similarly, the contacts of the successive pairs are interconnected to provide the input to each of the remaining filters. The disc is rotated by a motor in the same manner as the disc 30 of the previously described embodiment. While this embodiment is somewhat more complex than the first described embodiment, it does provide larger output signals for filtering and display.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a crosscorrelation apparatus for generating a binary and periodic test signal for a system input and a plurality of product signals equivalent to the output of the system multiplied by delay signals which correspond to the test signal but are delayed in time, the combination of: a rotating member having two annular tracks thereon, with one of said tracks having alternating conducting and non-conducting segments corresponding to the desired binary test signal, and with the other of said tracks having a complementary arrangement of conducting and non-conducting segments; means for connecting said conducting segments to a reference point; two potential sources connected to a junction point; means for connecting said junction point to the system input; an input signal contact positioned for riding on said one track and connected to one of said potential sources; a plurality of pairs of delay signal contacts positioned for riding on said tracks with each pair in radial alignment on the respective tracks; means for connecting the system output to each delay contact riding on one track; means for connecting the complement of the system output to each delay contact riding on the other track; means for interconnecting each pair of delay contacts to provide a product signal at each interconnection; and means for rotating said member to generate the test signal periodically.

2. In a crosscorrelation apparatus for generating a binary and periodic test signal for a system input and a plurality of product signals equivalent to the output of the system multiplied by delay signals which correspond to the test signal but are delayed in time, the combination of: a rotating member having an annular conducting band thereon, said band having a plurality of projecting segments forming a first annular track corresponding to the desired binary test signal and another plurality of projecting segments forming a second annular track complementary to said first track; two potential sources connected to a junction point; means for connecting said junction point to the system input; a reference contact positioned for riding on said band and connected to a reference point; an input signal contact positioned for riding on said first track and connected to one of said potential sources; a plurality of pairs of delay signal contacts positioned for riding on said tracks with each pair in radial alignment on the respective tracks; means for connecting the system output to each delay contact riding on one track; means for connecting the complement of the system output to each delay contact riding on the other track; means for interconnecting each pair of delay contacts to provide a product signal at each interconnection; and means for rotating said member to generate the test signal periodically.

3. In a crosscorrelation apparatus for generating a binary and periodic test signal for a system input and a plurality of product signals equivalent to the output of the system multiplied by delay signals which correspond to the test signal but are delayed in time, the combination of: a rotating member having an annular conducting band thereon, said band having a plurality of projecting segments forming a first annular track corresponding to the desired binary test signal and another plurality of projecting segments forming a second annular track complementary to said first track; a first source of potential above circuit ground and a second source of potential below circuit ground connected to a junction point; means for connecting said junction point to the system input; a reference contact positioned for riding on said band and connected to circuit ground; an input signal contact positioned for riding on said first track and connected to one of said potential sources; a plurality of pairs of delay signal contacts positioned for riding on said tracks with each pair in radial alignment on the respective tracks; means for connecting the system output to each delay contact riding on one track; means for connecting the complement of the system output to each delay contact riding on the other track; means for interconnecting each pair of delay contacts to provide a product signal at each interconnection; and means for rotating said member to generate the test signal periodically.

4. In a crosscorrelation apparatus for generating a binary and periodic test signal for a system input and a plurality of product signals equivalent to the output of the system multiplied by delay signals which correspond to the test signal but are delayed in time, the combination of: two input signal sources; switching means for coupling one or the other of the input signals to the system input to provide the desired binary test signal; a plurality of pairs of output lines, with one line of each pair connected to the system output and the other line of each pair connected to the complement of the system output; a plurality of switching means for coupling a line of each pair to an averaging filter input, with said switching means including a rotating member having at least two commutator tracks, with one track corresponding to the binary test signal and the other track being the complement of the one track; and means for rotating said member to provide a periodic test signal.

5. In a crosscorrelation apparatus for generating a binary and periodic test signal for a system input and a plurality of product signals equivalent to the output of the system multiplied by delay signals which correspond to the test signal but are delayed in time, the combination of: two input signal sources; first circuit means for alternately connecting each of the input signals to the system input; means for connecting to the system output for generating the complement of the system output; a plurality of second circuit means for alternately connecting the system output and the complement thereof to a corresponding averaging filter, with said circuit means including a commutator switch having a switching sequence corresponding to the desired binary test signal; and means for rotating said commutator switch to generate the binary test signal periodically for the system input and a plurality of delay signals periodically for the system output.

6. In a crosscorrelation apparatus for generating a binary and periodic test signal for a system input and a plurality of product signals equivalent to the output of the system multiplied by delay signals which correspond to the test signal but are delayed in time, the combination of: a rotating member having two pairs of annular tracks thereon, with one track of each pair having alternating conducting and nonconducting segments corresponding to the desired binary test signal, and with the other track of each pair having a complementary arrangement of conducting and nonconducting segments; means for connecting a first voltage source to the conducting segments of one track of the first pair; means for connecting a second voltage source to the conducting segments of the other track of the first pair; a pair of input signal contacts positioned for riding on the respective tracks of said first pair in radial alignment; means for connecting said input signal contacts to the system input; means for connecting the system output to the conducting segments of one track of the second pair; means for connecting the complement of the system output to the conducting segments of the other track of the second pair; a plurality of pairs of delay signal contacts positioned for riding on the respective tracks of said second pair, with each pair of contacts in radial alignment on the respective tracks and displaced angularly from the other pairs of contacts; means for interconnecting each pair of delay signal contacts to provide a product signal at each interconnection; and means for rotating said member to generate the test signal periodically.

No references cited.